(12) United States Patent
Xing et al.

(10) Patent No.: US 11,286,192 B2
(45) Date of Patent: Mar. 29, 2022

(54) HIGH-MOISTURE SLUDGE ULTRA-FINE SYNCHRONIZING DEEP-DRYING DEVICE AND A METHOD THEREOF

(71) Applicants: University of Science and Technology Beijing, Beijing (CN); Shengshi Weilan (Shandong) Environmental Science & Technology Co., Ltd., Yantai (CN)

(72) Inventors: Yi Xing, Beijing (CN); Chen Hong, Beijing (CN); Yanxiao Si, Beijing (CN); Wei Su, Beijing (CN); Bo Jiang, Beijing (CN)

(73) Assignees: University of Science and Technology Beijing, Beijing (CN); Shengshi Weilan (Shandong) Envi Sci & Tech Co Ltd, Yantai (CN)

( * ) Notice: Subject to any disclaimer, the term of this patent is extended or adjusted under 35 U.S.C. 154(b) by 121 days.

(21) Appl. No.: 16/824,659

(22) Filed: Mar. 19, 2020

(65) Prior Publication Data
US 2020/0308039 A1  Oct. 1, 2020

(30) Foreign Application Priority Data

Mar. 28, 2019  (CN) .......................... 201910244241.3

(51) Int. Cl.
*F26B 17/00* (2006.01)
*C02F 11/12* (2019.01)
(Continued)

(52) U.S. Cl.
CPC .............. *C02F 11/12* (2013.01); *F26B 1/005* (2013.01); *F26B 5/041* (2013.01); *F26B 17/103* (2013.01);
(Continued)

(58) Field of Classification Search
CPC ...... C02F 11/12; C02F 11/13; C02F 2303/26; C02F 2301/08; F26B 1/005; F26B 5/041;
(Continued)

(56) References Cited

U.S. PATENT DOCUMENTS 4,380,496 A    4/1983  Maffet
2004/0084367 A1*  5/2004  Wallin .................. C02F 11/185
                                                                 210/609
(Continued)

FOREIGN PATENT DOCUMENTS

CN    101468868 A    7/2009
CN    102211846 A    10/2011
(Continued)

OTHER PUBLICATIONS

First Office Action of Chinese Application No. 2019102442413 dated Apr. 2, 2020.

*Primary Examiner* — John P McCormack
(74) *Attorney, Agent, or Firm* — W&KIP

(57) ABSTRACT

The present invention discloses a high-moisture sludge ultra-fine synchronizing deep-drying device and a method thereof. The device has a sludge ultrafine pulverizing unit and a sludge drying unit arranged horizontally in parallel, and a pulverized sludge discharge port arranged between them. The sludge ultrafine pulverizing unit comprises a sludge pulverizing chamber and a sludge feeding port, and the sludge pulverizing chamber is a hollow cylindrical structure with a pulverizing rotation shaft arranged in the center, and the pulverizing rotation shaft is provided with a sludge pulverizing impeller. The lower part of the sludge feeding port is provided with a first baffle and/or a second deflector. The sludge is pulverized into sludge powders in the sludge pulverizing chamber, and then fed into the sludge (Continued)

drying chamber to be fluidized and dried. The present invention has the advantage of high drying efficiency, etc.

19 Claims, 3 Drawing Sheets

(51) Int. Cl.
- *F26B 1/00* (2006.01)
- *F26B 5/04* (2006.01)
- *F26B 17/10* (2006.01)
- *F26B 17/26* (2006.01)

(52) U.S. Cl.
CPC ............ *F26B 17/106* (2013.01); *F26B 17/26* (2013.01); *C02F 2301/08* (2013.01); *C02F 2303/26* (2013.01); *F26B 2200/18* (2013.01)

(58) Field of Classification Search
CPC ...... F26B 17/103; F26B 17/26; F26B 17/106; F26B 2200/18; F26B 3/06; F26B 3/0923; F26B 11/16; Y02W 10/37

USPC ......... 34/586, 503, 359, 360, 281, 423, 427, 34/576, 588, 589, 593, 104

See application file for complete search history.

(56) References Cited

U.S. PATENT DOCUMENTS

| | | | |
|---|---|---|---|
| 2010/0092652 A1* | 4/2010 | Ogura | ................... C10B 49/04 426/615 |
| 2018/0010852 A1* | 1/2018 | Tan | ........................ C02F 11/13 |
| 2018/0170784 A1 | 6/2018 | Baxter et al. | |

FOREIGN PATENT DOCUMENTS

| | | |
|---|---|---|
| CN | 103453747 A | 12/2013 |
| CN | 206385008 U | 8/2017 |
| CN | 209778629 U | 12/2019 |
| KR | 20100087471 A | 8/2010 |

\* cited by examiner

HIGH-MOISTURE SLUDGE ULTRA-FINE SYNCHRONIZING DEEP-DRYING DEVICE AND A METHOD THEREOF

CROSS-REFERENCE TO RELATED APPLICATION

This application claims priority benefits to Chinese Patent Application No. 201910244241.3, filed on Mar. 28, 2019. The contents of all of the aforementioned applications are incorporated herein by reference.

FIELD OF THE INVENTION

The present invention relates to a high-moisture sludge ultra-fine synchronizing deep-drying device and a method thereof, and in particular to a device and a process for deep dehydration of residual sludge, belonging to the sub-area of residual sludge from urban sewage treatment plant in the field of environmental protection.

BACKGROUND OF THE INVENTION

With the development of China's society and urbanization, the amount of urban sewage is increasing, the number of corresponding sewage treatment facilities is increasing, and the amount of residual sludge-by-product of sewage treatment is increasing as well. By 2017, the annual output of residual sludge in China has exceeded 40 million tons, while the harmless treatment rate is less than 10%. How to properly dispose of these continuously produced and increasingly large quantities of sludge has become an urgent problem to be solved in China's environmental protection.

The residual sludge produced by most domestic sewage treatment plants has a moisture content of more than 80 wt %. Sludge dehydration is a key step in the process of treatment. However, it is difficult to subject sludge to deep dehydration, which has become a bottleneck problem, limiting the harmless and resourceful treatment of sludge.

At present, the main processes of sludge dehydration and drying comprise solar drying, thermal drying, conditioning-pressure filtering dehydration, etc. The solar drying process can reduce the moisture content of the sludge to less than 10 wt % by utilizing the thermal effect of solar energy, so as to achieve the purpose of deep drying, but it is difficult to be widely applied due to large covering area, long treatment time cycle and great influence of change with weather. The thermal drying technology removes the moisture in the sludge through direct heating or indirect heating, and the moisture content of the sludge can be reduced to less than 40 wt %, and further reducing in the moisture content will require a substantial increase in energy consumption. Conditioning-pressure filtering dehydration technology can reduce the moisture content of the sludge to 60 wt % by treating residual sludge with a conditioner to improve the dehydration performance of the sludge, and then subjecting the sludge to pressing and dehydration using a filter press. The above process can quickly remove the moisture in the sludge, but the degree of dehydration is limited, and it is difficult to achieve deep drying of the sludge (a moisture content of equal to or less than 20 wt %).

Therefore, the current development direction is to further reduce the moisture content of the semi-dry sludge produced by the thermal drying or mechanical dehydration process, and realize deep drying of the residual sludge rapidly and efficiently.

SUMMARY OF THE INVENTION

The present application aims to provide a high-moisture sludge ultra-fine synchronizing deep-drying device and a method thereof, which can increase the contact area by pulverizing the sludge, thereby improving the drying efficiency.

The present application is realized by the following technical solution.

A high-moisture sludge ultra-fine synchronizing deep-drying device, comprising a sludge ultrafine pulverizing unit and a sludge drying unit arranged horizontally in parallel, and a pulverized sludge discharge port arranged between the sludge ultrafine pulverizing unit and the sludge drying unit to communicate with each other;

wherein, the sludge ultrafine pulverizing unit comprises a sludge pulverizing chamber and a sludge feeding port arranged at one end of the sludge pulverizing chamber, and the sludge pulverizing chamber is a hollow cylindrical structure with a pulverizing rotation shaft horizontally arranged in the center, and the pulverizing rotation shaft is provided with a sludge pulverizing impeller; and a guiding baffle is arranged at a lower part of the sludge feeding port near a side of the sludge pulverizing impeller.

The sludge drying unit comprises a sludge drying chamber and a fluidizing rotation shaft arranged at a lower part of the sludge drying chamber, the fluidizing rotation shaft is arranged horizontally and concentric with the pulverizing rotation shaft; and the fluidizing rotation shaft is provided with a fluidizing impeller.

An upper part of the sludge drying chamber is provided with a mixing rotation shaft arranged horizontally, a plurality of mixing impellers are provided on the mixing rotation shaft, and the upper part of the sludge drying chamber is further provided with an air inlet located below the mixing impellers.

A lower part of the sludge drying chamber is provided with a dried sludge outlet arranged at a side away from the pulverized sludge discharge port; and the fluidized rotation shaft is arranged to be through the dried sludge outlet.

In the above technical solution, the sludge pulverizing impeller, the fluidizing impeller and the mixing impeller are all provided with a steering control unit.

In the above technical solution, the sludge pulverizing impeller comprises a plurality of blades uniformly arranged in a concentric circle with the pulverizing rotation shaft as the center, and an angle $\chi$ of 0° to 25° is formed between each of the blades and the axial direction of the pulverizing rotating shaft.

Preferably, the number of the blades is 4 to 8.

In the above technical solution, two or more sets of sludge pulverizing impellers are arranged along an axial direction of the pulverizing rotation shaft.

In the above technical solution, the lower part of the sludge feeding port is provided with a first deflector which is located above the pulverizing rotation shaft, and the first deflector is inclined downward along the traveling direction of the sludge with an inclination angle $\alpha$ of 15° to 30°.

In the above technical solution, the lower part of the sludge feeding port is provided with a second deflector, which is located below the pulverizing rotation shaft, and the second deflector is inclined downward along the traveling direction of the sludge with an inclination angle $\beta$ of 15° to 60°.

In the above technical solution, a pulverizing sludge guiding module is annularly disposed on an inner wall of the sludge pulverizing chamber, the pulverizing sludge guiding module has a right-angled trapezoidal section, and the pulverizing sludge guiding module is arranged inside the pulverized sludge discharge port.

In the above technical solution, there are several sludge drying chambers arranged in parallel, the fluidized rotation shaft horizontally passes through the lower portion of the sludge drying chambers, and these several sludge drying chambers arranged in parallel to form a multi-stage sludge drying chamber comprising at least a first sludge drying chamber, and a next sludge drying chamber.

In the above technical solution, the dried sludge outlet is provided with a moving guiding module and a fixed guiding module; the fixed guiding module is semi-annularly disposed at the bottom of the sludge drying chamber, and an upper portion of the fixed guiding module is provided with a guiding slope that contracts toward the outlet direction; and the moving guiding module is a block that is capable of moving up and down.

In the above technical solution, the guiding slope has an inclination angle η of 45° to 70°.

In the above technical solution, one side of the block shows an obtuse angle triangle which expending and decreasing gradually from top to bottom, and the obtuse angle γ of the obtuse triangle is 120° to 160°; the other side of the block is a plane that is attached to the vertical wall of the sludge drying chamber.

In the above technical solution, there are at least two fluidizing impellers arranged axially along the fluidizing rotation shaft; each fluidizing impeller comprises a plurality of fluidizing blades, and an axial angle ε of 0° to 10° is formed between the fluidized blades and the fluidizing rotation shaft.

In the above technical solution, each of the mixing impellers comprises a plurality of mixing blades, and an axial angle φ of 0° to 15° is formed between the mixing blades and the mixing rotation shaft.

In the above technical solution, the device further comprises a separation collection chamber arranged behind the sludge drying chamber.

A method of sludge ultra-fine synchronizing deep-drying is provided, the method comprising the following steps:

pulverizing high-moisture sludge into coarse sludge particles which are fed into the sludge pulverizing chamber through the sludge feeding port, and adjusting rotation speed of the pulverizing rotation shaft to pulverize the sludge coarse particles passing the sludge pulverizing impellers into sludge powders, and transferring the sludge powders upon the pulverizing rotation shaft to the pulverized sludge discharge port as rotation of the pulverizing rotation shaft and pushing the sludge powders into the sludge drying chamber from the pulverized sludge discharge port;

adjusting rotation speed of the fluidized rotation shaft, so that the sludge powders are fluidized in the sludge drying chamber under a disturbance of the fluidizing impeller; and introducing dry air from an air inlet to mix it with the fluidized sludge powders in the sludge drying chamber and dry the sludge powders;

adjusting rotation speed of the mixing rotation shaft, so that the fluidized sludge powders in the sludge drying chamber are uniformly mixed with the dry air, and the sludge powders are sufficiently dried to become dried sludge powders and discharged from the dried sludge outlet; and separating and collecting the dried sludge powders.

The sludge ultra-fine synchronizing deep-drying device has several sludge drying chambers arranged in parallel, forming a multi-stage sludge drying chamber comprising at least a first sludge drying chamber, a second sludge drying chamber, and/or a last sludge drying chamber, and the method further comprises the following steps:

pulverizing high-moisture sludge into coarse sludge particles which are fed into the sludge pulverizing chamber through the sludge feeding port, and adjusting the rotation speed of the pulverizing rotation shaft to pulverize the sludge coarse particles passing the sludge pulverizing impellers into sludge powders, and transferring the sludge powders upon the pulverizing rotation shaft to the pulverized sludge discharge port as rotation of the pulverizing rotation shaft, and pushing the sludge powders into the first sludge drying chamber from the pulverized sludge discharge port;

adjusting the rotation speed of the fluidized rotation shaft, so that the sludge powders are fluidized in the first sludge drying chamber under the disturbance of the fluidizing impeller; and introducing dry air from an air inlet to mix it with the fluidized sludge powders in the first sludge drying chamber and dry the sludge powders;

adjusting the rotation speed of the mixing rotation shaft, so that the fluidized sludge powders in the first sludge drying chamber are uniformly mixed with the dry air, and the sludge powders are sufficiently dried to become dried sludge powders;

allowing the dried sludge powders from the dried sludge outlet of the first sludge drying chamber into the second sludge drying chamber, and repeating the above drying process in the second sludge drying chamber until dried sludge powders are obtained and discharged from the dried sludge outlet of the last sludge drying chamber; and separating and collecting the dried sludge powders.

In the above technical solution, the high-moisture sludge has a moisture content of 35 wt %-60 wt %; and the dried sludge has a moisture content of 10 wt % to 30 wt %.

In the above technical solution, the sludge coarse particle has a particle size of 0.5 cm to 3 cm; and the sludge powder has a particle size of 10 μm to 300 μm.

In the above technical solution, the pulverizing rotation shaft has a rotation speed of 1000 r/min to 3000 r/min; the fluidized rotating shaft has a rotation speed of 500 r/min to 1200 r/min, and the mixing rotation shaft has a rotation speed of 300 r/min to 1500 r/min.

In the above technical solution, the dry air has a temperature of 20° C. to 80° C.

The present invention has the following advantages and beneficial effects: pulverizing the sludge into fine particles can significantly increase the contact area between the sludge and the air, the airflow temperature required for drying is reduced, and the sludge drying efficiency is improved. Improving in drying efficiency greatly reduces the moisture content of drying the sludge from 40 wt % to less than 20 wt %, thereby increasing the scope and economy of reclamation disposal of the sludge end.

Figure 1:
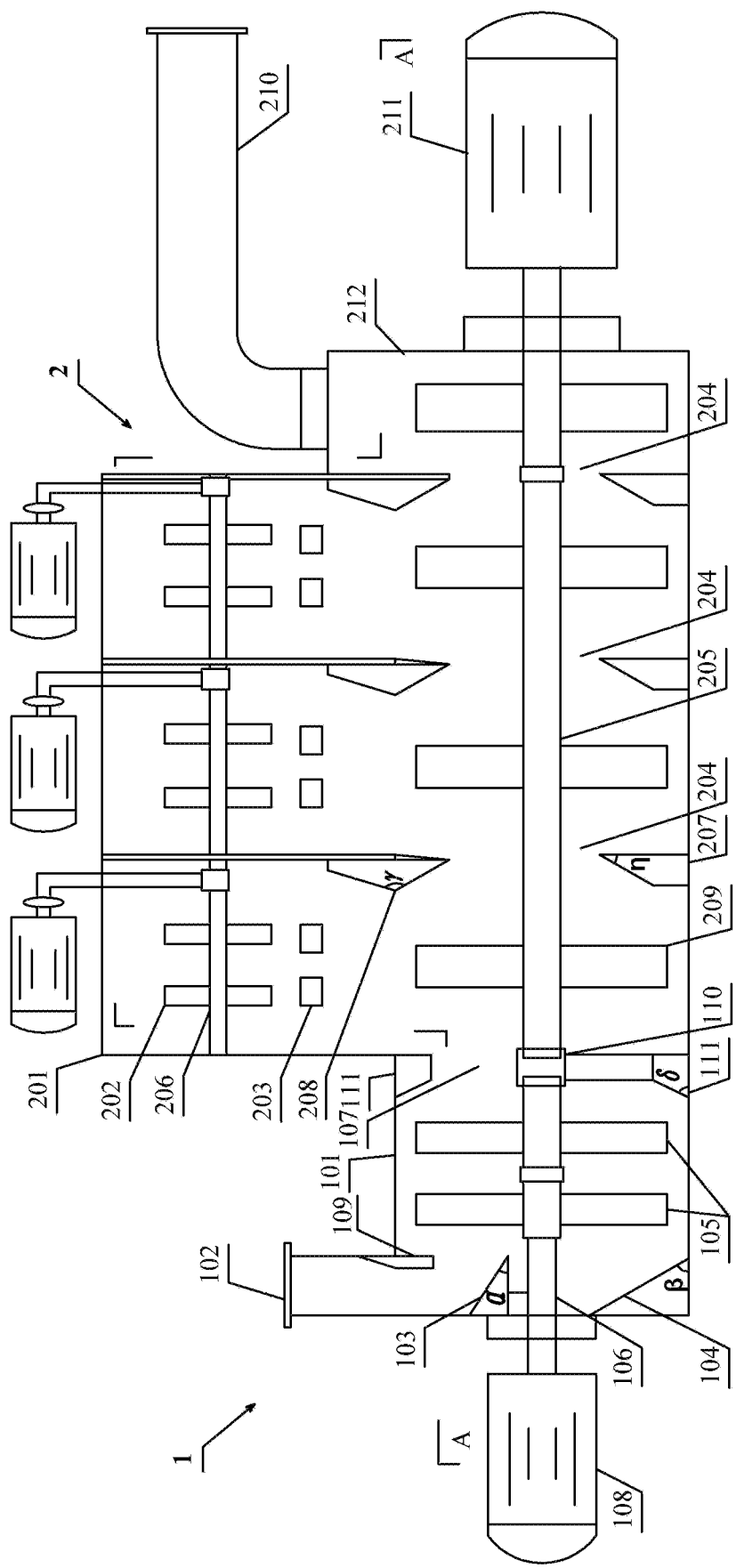
FIG. 1 shows a schematic view of a high-moisture sludge ultra-fine synchronizing deep-drying device according to one embodiment of the present invention.
Figure 2:
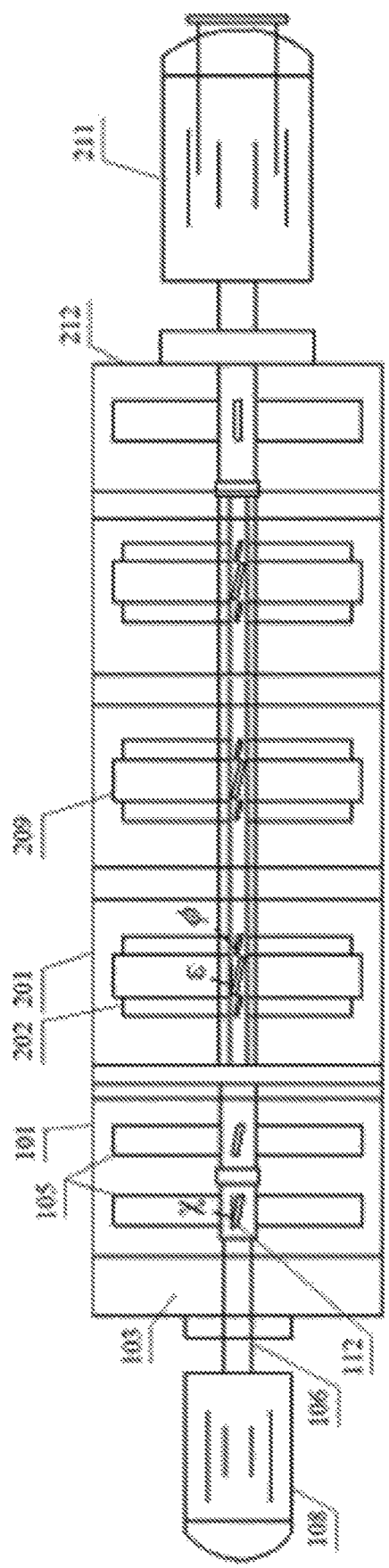
FIG. 2 shows an A-A top view of FIG. 1.
Figure 3:
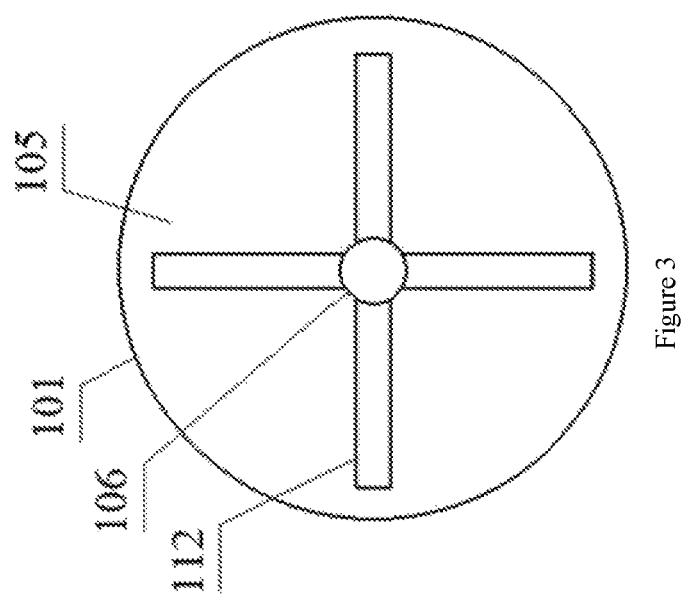
FIG. 3 shows a schematic view showing a fluidized impeller according to the present invention.

The following numerical reference is as follows, 1—sludge ultrafine pulverizing unit; 101—sludge pulverizing chamber; 102—sludge feeding port; 103—first deflector; 104—second deflector; 105—sludge pulverizing impeller; 106—pulverizing rotation shaft; 107—pulverized sludge discharge port; 108—pulverizing motor; 109—guiding baffle; 110—bearing housing; 111—pulverizing sludge guiding module; 112—blade; 2—sludge drying unit; 201—sludge drying chamber; 202—mixing impeller; 203—air inlet; 204—dried sludge outlet; 205—fluidized rotation shaft; 206—mixing rotation shaft; 207—fixed guiding module; 208—moving guiding module; 209—fluidizing impeller; 210—pipeline; 211—fluidizing motor; 212—separation collection chamber.

DETAILED DESCRIPTION OF THE EMBODIMENTS

The specific implementation and working process of the present invention will be further described below with reference to the drawings.

The terms such as upper, lower, left, right, front, and rear in the present application are established based on the positional relationship shown in the drawings. In different drawings, the corresponding positional relationship may also change accordingly, so it cannot be understood as a limitation on the protection scope.

As shown in FIG. 1, a high-moisture sludge ultra-fine synchronizing deep-drying device, comprising a sludge ultrafine pulverizing unit 1 and a sludge drying unit 2 arranged horizontally in parallel, and a pulverized sludge discharge port 107 arranged between the sludge ultrafine pulverizing unit 1 and the sludge drying unit 2 to communicate with each other.

The sludge ultrafine pulverizing unit comprises a sludge pulverizing chamber 101 and a sludge feeding port 102 arranged at one end of the sludge pulverizing chamber 101, and the sludge pulverizing chamber 101 is a hollow cylindrical structure with a pulverizing rotation shaft 106 horizontally arranged in the center, and the pulverizing rotation shaft 106 is provided with a sludge pulverizing impeller 105. The sludge pulverizing impeller 105 comprises a plurality of blades 112, preferably, the plurality of blades 112 is 4 to 8 blades 112, which are uniformly arranged in a concentric circle with the pulverizing rotation shaft 106 as the center, and an angle $\chi$ of 0° to 25° is formed between each of the blades 112 and the axial direction of the pulverizing rotating shaft 106.

Two or more sets of sludge pulverizing impellers 105 are arranged along an axial direction of the pulverizing rotation shaft 106.

A guiding baffle 109 is arranged at a lower part of the sludge feeding port 102 near a side of the sludge pulverizing impeller 105, so that the sludge from the sludge feeding port 102 can fall onto the pulverizing rotating shaft 106 as much as possible under the guiding of the guiding baffle 109.

The lower part of the sludge feeding port 102 is provided with a first deflector 103 and/or a second deflector 104 to further guide the flow, and also to prevent the sludge from accumulating at a corner of the sludge pulverizing chamber 101 locating at the bottom of the sludge feeding port 102. The first deflector 103 is located above the pulverizing rotation shaft 106, and the first deflector 103 is inclined downward along the traveling direction of the sludge with an inclination angle $\alpha$ of 15° to 30°, presenting as an inclined slope lower in front and higher in rear. The second deflector 104 is located below the pulverizing rotation shaft 106, and the second deflector 104 is inclined downward along the traveling direction of the sludge with an inclination angle $\beta$ of 15° to 60°, presenting as an inclined slope lower in front and higher in rear. When the sludge feeding port 102 is taken as rear, the direction of the pulverized sludge discharge port 107 is taken as front.

The sludge drying unit 2 comprises a sludge drying chamber 201 and a fluidizing rotation shaft 205 arranged at a lower part of the sludge drying chamber 201, the fluidizing rotation shaft 205 is arranged horizontally, driven by a fluidizing motor 211, and is concentric with the pulverizing rotation shaft 106; and the fluidizing rotation shaft 205 is provided with a fluidizing impeller 209.

An upper part of the sludge drying chamber 201 is provided with a mixing rotation shaft 206 arranged horizontally, a plurality of mixing impellers 202 are provided on the mixing rotation shaft 206, and the upper part of the sludge drying chamber 201 is further provided with a plurality of air inlets 203 located below the mixing impellers 202.

A lower part of the sludge drying chamber 201 is provided with a dried sludge outlet 204 arranged at a side away from the pulverized sludge discharge port 107; and the fluidized rotation shaft 205 is arranged through the dried sludge outlet 204.

The sludge pulverizing impeller, the fluidizing impeller and the mixing impeller are all provided with a steering control unit.

A pulverizing sludge guiding module 111 is annularly disposed on an inner wall of the sludge pulverizing chamber 101, the pulverizing sludge guiding module 111 has a right-angled trapezoidal section, and the angle $\delta$ between the trapezoid bevael and the bottom edge is 30° to 60°. The pulverizing sludge guiding module 111 is arranged inside the pulverized sludge discharge port 107. The pulverized sludge discharge port 107 is also provided with a bearing housing 110 for supporting the pulverizing rotation shaft 106 and the fluidizing rotation shaft 205. The bearing housing 110 is composed of a bearing sleeve suspended within the pulverized sludge discharge port 107, and 3 to 6 supporting rods connecting the bearing sleeve and the inner wall of the pulverized sludge discharge port 107. The support rod has a circular, triangular, diamond or triangle-square shaped (triangular shape in front, and square shape in rear) cross section, and one angle of the triangular, diamond or triangle-square shaped cross section faces the sludge pulverizing impeller 105.

As a preferably solution, there are several sludge drying chambers 201 arranged in parallel, and the fluidized rotation shaft 205 horizontally passes through the lower portion of the sludge drying chambers 201. The several sludge drying chambers 201 form a multi-stage sludge drying chamber comprising at least a first sludge drying chamber and a next sludge drying chamber. Each sludge drying chamber has a mixing rotation shaft 206 controlled by an independent motor.

The dried sludge outlet 204 is provided with a moving guiding module 208 and a fixed guiding module 207; the fixed guiding module 207 is semi-annularly disposed at the bottom of the sludge drying chamber 201, and an upper portion of the fixed guiding module 207 is provided with a guiding slope that contracts toward the outlet direction; and the guiding slope has an inclination angle $\eta$ of 45° to 70°.

The moving guiding module 208 is a block that is capable of moving up and down. One side of the block shows an obtuse angle triangle which expanding from top and then decreasing gradually to bottom, and the obtuse angle $\gamma$ of the obtuse triangle is 120° to 160°; the other side of the block is a plane that is attached to the vertical wall of the sludge drying chamber 201.

There are at least two fluidizing impellers 209 arranged axially along the fluidizing rotation shaft 205; each fluidizing impeller 209 comprises a plurality of fluidizing blades, and an axial angle ε of 0° to 10° is formed between the fluidized blades and the fluidizing rotation shaft 205.

Each set of the mixing impeller 202 comprises a plurality of mixing blades, and an axial angle φ of 0° to 15° is formed between the mixing blades and the mixing rotation shaft 206.

The device comprises a separation collection chamber 212 arranged behind the sludge drying chamber 201. When providing a plurality of sludge drying chambers, the separation collection chamber 212 is disposed after the last sludge drying chamber 201. The separated air is discharged from the pipe 210 for further purification.

The high-moisture sludge having a moisture content of 35 wt % to 60 wt % is pulverized into coarse sludge particles having a particle diameter of 0.5 cm to 3 cm, and the sludge coarse particles are fed into the sludge pulverizing chamber 101 through the sludge feeding port 102, then the pulverizing rotation shaft 106 is adjusted to have a rotation speed of 1000 r/min to 3000 r/min to pulverize the coarse sludge particles passed through the sludge pulverizing impeller 105 into sludge powders having a particle diameter of 10 μm to 300 μm.

The sludge powders upon the pulverizing rotation shaft 106 are transferred to the pulverized sludge discharge port 107 as rotation of the pulverizing rotation shaft, and are pushed into the sludge drying chamber 201 from the pulverized sludge discharge port 107 under the guiding of the pulverizing sludge guiding module 111.

The fluidized rotating shaft 205 is adjusted to have a rotation speed of 500 r/min to 1200 r/min, so that the sludge powders are fluidized in the sludge drying chamber 201 under the disturbance of the fluidizing impeller 209, and dry air with a temperature of 20° C. to 80° C. is introduced from an air inlet 203 to mix with the fluidized sludge powders in the sludge drying chamber 201.

The mixing rotation shaft 206 is adjusted to have a rotation speed of 300 r/min to 1500 r/min, so that the fluidized sludge powders in the sludge drying chamber 201 is uniformly mixed with the dry air, and the water and gas exchange is sufficiently performed, and the sludge powders are fully dried to become dry sludge powders and discharged from a dried sludge outlet 204. Meanwhile, the dry air absorbs the moisture in the sludge powders and becomes moist air. Since the dry sludge powders discharged from the dried sludge outlet 204 are mixed with the moist air, the dried sludge is further separated and collected. Test results show that the dried sludge subjected to deep dehydration has a moisture content of 10 wt %-30 wt %.

A plurality of sludge drying chambers 201 are arranged in parallel, forming a multi-stage sludge drying chamber comprising at least a first sludge drying chamber, a second sludge drying chamber, and/or a last sludge drying chamber.

High-moisture sludge having a moisture content of 35 wt % to 60 wt % is pulverized into coarse sludge particles having a particle size of 0.5 cm to 3 cm, the coarse sludge particles are fed into the sludge pulverizing chamber 101 through the sludge feeding port 102, and the pulverizing rotation shaft 106 is adjusted to have a rotation speed of 1000 r/min to 3000 r/min to pulverize the sludge coarse particles passing through the sludge pulverizing impellers 105 into sludge powders having a particle size of 10 μm to 300 μm, then the sludge powders upon the pulverizing rotation shaft 106 are transferred to the pulverized sludge discharge port 107 as rotation of the pulverizing rotation shaft 106, and the sludge powders are pushed into the first sludge drying chamber from the pulverized sludge discharge port 107.

The fluidized rotation shaft 205 is adjusted to have a rotation speed of 500 r/min to 1200 r/min, so that the sludge powders are fluidized in the first sludge drying chamber under the disturbance of the fluidizing impeller 209; and dry air having a temperature of 20° C. to 80° C. is introduced from an air inlet 203 to mix with the fluidized sludge powders in the first sludge drying chamber and dry the sludge powders.

The mixing rotation shaft 206 is adjusted to have a rotation speed of 300 r/min to 1500 r/min, so that the fluidized sludge powders in the first sludge drying chamber are uniformly mixed with the dry air, and the sludge powders are sufficiently dried to become dried sludge powders.

The dried sludge powders from the dried sludge outlet 204 of the first sludge drying chamber are transferred into the second sludge drying chamber, and the above drying process in the second sludge drying chamber is repeated until dried sludge powders are obtained and discharged from the dried sludge outlet of the last sludge drying chamber, finally separating and collecting the dried sludge powders. The dried sludge subjected to deep dehydration and drying has a moisture content of 10 wt %-30 wt %.

In the above-described implementation process, the dry air can be recycled, and is usually recycled for 3 to 8 times before being discharged as an exhaust gas for purification treatment.

Obviously, the embodiments described above are merely examples for clear description, and are not intended to limit the implementations. Other variations or modifications of the various forms may also be made by those skilled in the art based on the above description. There is no need and no way to exhaust all of the implementations here. Obvious variations or modifications derived therefrom are still within the protection scope of the invention-creation.

We claim:

1. A high-moisture sludge ultra-fine synchronizing deep-drying device, comprising a sludge ultrafine pulverizing unit and a sludge drying unit juxtaposed horizontally, and a pulverized sludge discharge port arranged between the sludge ultrafine pulverizing unit and the sludge drying unit;
   wherein, the sludge ultrafine pulverizing unit comprises a sludge pulverizing chamber and a sludge feeding port arranged at one end of the sludge pulverizing chamber, and the sludge pulverizing chamber is a hollow cylindrical structure with a pulverizing rotation shaft horizontally arranged in the center, and the pulverizing rotation shaft is provided with a sludge pulverizing impeller;
   the sludge drying unit comprises a sludge drying chamber and a fluidizing rotation shaft arranged at a lower part of the sludge drying chamber, the fluidizing rotation shaft is arranged horizontally and coaxial with the pulverizing rotation shaft; and the fluidizing rotation shaft is provided with a fluidizing impeller;
   an upper part of the sludge drying chamber is provided with a mixing rotation shaft arranged horizontally, a plurality of mixing impellers are provided on the mixing rotation shaft, and the upper part of the sludge drying chamber is further provided with an air inlet located below the mixing impellers; and
   a lower part of the sludge drying chamber is provided with a dried sludge outlet arranged at a side away from the pulverized sludge discharge port; and the fluidized rotation shaft is arranged through the dried sludge outlet.

2. The device of claim 1, wherein, the sludge pulverizing impeller comprises a plurality of blades uniformly arranged in a concentric circle with the pulverizing rotation shaft as the center, and an angle $\chi$ of 0° to 25° is formed between each of the blades and the axial direction of the pulverizing rotating shaft.

3. The device of claim 1, wherein, two or more sets of sludge pulverizing impellers are arranged along an axial direction of the pulverizing rotation shaft.

4. The device of claim 1, wherein, a guiding baffle is vertically arranged at a lower part of the sludge feeding port near a side of the sludge pulverizing impeller.

5. The device of claim 1, wherein, the lower part of the sludge feeding port is provided with a first deflector which is located above the pulverizing rotation shaft, and the first deflector is inclined downward along the traveling direction of the sludge with an inclination angle $\alpha$ of 15° to 30°.

6. The device of claim 4, wherein, the lower part of the sludge feeding port is provided with a second deflector, which is located below the pulverizing rotation shaft, and the second deflector is inclined downward along the traveling direction of the sludge with an inclination angle $\beta$ of 15° to 60°.

7. The device of claim 1, wherein, a pulverizing sludge guiding member is annularly disposed on an inner wall of the sludge pulverizing chamber, the pulverizing sludge guiding member has a right-angled trapezoidal section, and the pulverizing sludge guiding member is arranged inside the pulverized sludge discharge port.

8. The device of claim 1, wherein the device comprises several sludge drying chambers arranged in parallel, and the fluidized rotation shaft horizontally passes through the lower portion of the sludge drying chambers.

9. The device of claim 1, wherein, the dried sludge outlet is provided with a moving guiding module and a fixed guiding module; the fixed guiding module is semi-annularly disposed at the bottom of the sludge drying chamber, and an upper portion of the fixed guiding module is provided with a guiding slope that contracts toward the outlet direction; and the moving guiding module is a block that is capable of moving up and down.

10. The device of claim 1, wherein, the guiding slope has an inclination angle $\eta$ of 45° to 70°.

11. The device of claim 1, wherein, there are at least two fluidizing impellers arranged axially along the fluidizing rotation shaft; each fluidizing impeller comprises a plurality of fluidizing blades, and an axial angle $\varepsilon$ of 0° to 10° is formed between the fluidized blades and the fluidizing rotation shaft.

12. The device of claim 1, wherein, each of the mixing impellers comprises a plurality of mixing blades, and an axial angle $\varphi$ of 0° to 15° is formed between the mixing blades and the mixing rotation shaft.

13. The device of claim 1, further comprising a separation collection chamber arranged behind the sludge drying chamber.

14. A method of sludge ultra-fine synchronizing deep-drying by using the sludge ultra-fine synchronous deep drying device of claim 1, comprising:
pulverizing high-moisture sludge into coarse sludge particles which are fed into the sludge pulverizing chamber through the sludge feeding port, and adjusting rotation speed of the pulverizing rotation shaft to pulverize the sludge coarse particles passing the sludge pulverizing impellers into sludge powders, and transferring the sludge powders upon the pulverizing rotation shaft to the pulverized sludge discharge port as rotation of the pulverizing rotation shaft and pushing the sludge powders into the sludge drying chamber from the pulverized sludge discharge port;
adjusting rotation speed of the fluidized rotation shaft, so that the sludge powders are fluidized in the sludge drying chamber under a disturbance of the fluidizing impeller; and introducing dry air from an air inlet to mix it with the fluidized sludge powders in the sludge drying chamber and dry the sludge powders;
adjusting rotation speed of the mixing rotation shaft, so that the fluidized sludge powders in the sludge drying chamber are uniformly mixed with the dry air, and the sludge powders are sufficiently dried to become dried sludge powders and discharged from the dried sludge outlet; and
separating and collecting the dried sludge powders.

15. The method of claim 14, wherein, the sludge ultra-fine synchronizing deep-drying device has several sludge drying chambers arranged in parallel, forming a multi-stage sludge drying chamber comprising at least a first sludge drying chamber, a second sludge drying chamber, and/or a last sludge drying chamber, and the method further comprises:
pulverizing high-moisture sludge into coarse sludge particles which are fed into the sludge pulverizing chamber through the sludge feeding port, and adjusting the rotation speed of the pulverizing rotation shaft to pulverize the sludge coarse particles passing the sludge pulverizing impellers into sludge powders, and transferring the sludge powders upon the pulverizing rotation shaft to the pulverized sludge discharge port as rotation of the pulverizing rotation shaft, and pushing the sludge powders into the first sludge drying chamber from the pulverized sludge discharge port;
adjusting the rotation speed of the fluidized rotation shaft, so that the sludge powders are fluidized in the first sludge drying chamber under the disturbance of the fluidizing impeller; and introducing dry air from an air inlet to mix with the fluidized sludge powders in the first sludge drying chamber and dry the sludge powders;
adjusting the rotation speed of the mixing rotation shaft, so that the fluidized sludge powders in the first sludge drying chamber are uniformly mixed with the dry air, and the sludge powders are sufficiently dried to become dried sludge powders;
allowing the dried sludge powders from the dried sludge outlet of the first sludge drying chamber into the second sludge drying chamber, and repeating the above drying process in the second sludge drying chamber until dried sludge powders are obtained and discharged from the dried sludge outlet of the last sludge drying chamber; and
separating and collecting the dried sludge powders.

16. The method of claim 15, wherein, the high-moisture sludge has a moisture content of 35 wt %-60%; and the dried sludge has a moisture content of 10 wt % to 30 wt %.

17. The method of claim 14, wherein, the sludge coarse particle has a particle size of 0.5 cm to 3 cm; and the sludge powder has a particle size of 10 µm to 300 µm.

18. The method of claim 14, wherein, the pulverizing rotation shaft has a rotation speed of 1000 r/min to 3000 r/min; the fluidized rotating shaft has a rotation speed of 500 r/min to 1200 r/min, and the mixing rotation shaft has a rotation speed of 300 r/min to 1500 r/min.

19. The method of claim 14, wherein, the dry air has a temperature of 20° C. to 80° C.

* * * * *